United States Patent [19]

Sano et al.

[11] Patent Number: 4,669,744

[45] Date of Patent: Jun. 2, 1987

[54] METHOD OF CONTROLLING THE STEERING OF REAR WHEELS OF A MOTOR VEHICLE WITH STEERABLE FRONT AND REAR WHEELS

[75] Inventors: Shoichi Sano, Tokyo; Yoshimi Furukawa, Tochigi, both of Japan

[73] Assignee: Honda Giken Kogyo Kabushiki Kaisha, Tokyo, Japan

[21] Appl. No.: 849,763

[22] Filed: Apr. 9, 1986

[30] Foreign Application Priority Data

Apr. 10, 1985 [JP] Japan .................................. 60-76117

[51] Int. Cl.$^4$ .............................................. B62D 7/00
[52] U.S. Cl. ...................................... 280/91; 180/140; 180/142; 180/236; 280/99
[58] Field of Search .................... 280/91, 99; 180/140, 180/142, 236

[56] References Cited

U.S. PATENT DOCUMENTS

| 4,313,514 | 2/1982 | Furukawa et al. | 280/91 |
| 4,412,594 | 11/1983 | Furukawa et al. | 180/142 |
| 4,566,709 | 1/1986 | Sano | 280/91 |

FOREIGN PATENT DOCUMENTS

| 59-70261 | 4/1984 | Japan . |
| 59-77968 | 5/1984 | Japan . |
| 59-77970 | 5/1984 | Japan . |
| 59-77971 | 5/1984 | Japan . |
| 59-81257 | 5/1984 | Japan . |
| 59-81258 | 5/1984 | Japan . |

Primary Examiner—John J. Love
Assistant Examiner—Kenneth R. Rice
Attorney, Agent, or Firm—Irving M. Weiner; Joseph P. Carrier; Pamela S. Burt

[57] ABSTRACT

A motor vehicle has two steerable righthand and lefthand front wheels and two steerable righthand and lefthand rear wheels, a front wheel steering device for steering the front wheels according to the angle through which a steering wheel is turned, a rear wheel steering device for steering the rear wheels, an actuator for actuating said rear wheel steering device, and a control device for controlling the operation of the actuator to steer the rear wheels in a direction which is selectively the same as or opposite to the direction in which the front wheels are turned. The steering of the rear wheels is controlled by determining the speeds of rotation of the four front and rear wheels with respect to the ground, and controlling the operation of the actuator with the control device so that any difference between the speeds of rotation of the front and rear wheels with respect to the ground will be reduced substantially to zero.

5 Claims, 8 Drawing Figures

METHOD OF CONTROLLING THE STEERING OF REAR WHEELS OF A MOTOR VEHICLE WITH STEERABLE FRONT AND REAR WHEELS

BACKGROUND OF THE INVENTION

1. Field of the Invention

The present invention relates to a method of controlling the steering of rear wheels of a motor vehicle having steerable front and rear wheels.

2. Discussion of Relevant Art

There is known a motor vehicle having a frontwheel steering device for steering the front wheels according to the angle through which a steering wheel is turned, a rear-wheel steering device for steering the rear wheels with an actuator, and a control device responsive to the speed of travel of the motor vehicle and the steering angle of the steering wheel for controlling the operation of the actuator to steer the rear wheels in a direction which is selectively the same as or opposite to the direction in which the front wheels are turned. Such a motor vehicle is disclosed in Japanese Laid-Open patent Publication Nos. 59-70261, 59-77968, 59-77970, 59-77971, 59-81257, and 59-81258, for example.

The motor vehicle with steerable front and rear wheels is advantageous for the following reasons. Initially, when a front-wheel-steered motor vehicle with rear wheels that are not steerable makes an S-shaped turn at a relatively high speed, the extent to which the motor vehicle has to swing is large since the center of gravity G of the motor vehicle is laterally shifted at a large angle $\theta$, as shown in FIG. 1(a). Quite differently, when a motor vehicle with steerable front and rear wheels goes along the same S-shaped turn at a relatively high speed, the front and rear wheels are steered in the same direction as shown in FIG. 1(b) to substantially eliminate the angle at which the center of gravity G is laterally shifted, thereby minimizing the swinging movement of the motor vehicle.

In the motor vehicle with the steerable front and rear wheels, therefore, the swinging movement of the center of gravity G about a vertical axis can be held to a minimum when the motor vehicle makes a turn at a relatively high speed. As a result, the motor vehicle has improved dynamic effects, i.e., the response delay in the motion of the motor vehicle is reduced, and the tires remain stuck to the road surface stably over a greater speed range on curving roads for giving the motor vehicle higher limitations in performance and maneuverability.

Furthermore, when travelling along a curve at a low speed, the front-wheel-steered motor vehicle has a large difference between the radii of turns followed by the front and rear inner wheels, as shown in FIG. 2(a), and hence the radius of turns that the motor vehicle can make cannot be reduced below a certain limitation. With the motor vehicle having the steerable front and rear wheels, however, the front and rear wheels are steered in opposite directions as shown in FIG. 2(b), with the result that static effects can be produced, i.e., the radius of turns followed by the motor vehicle is smaller, and the difference l between the radii of turns of the front and rear inner wheels is substantially eliminated.

The principle of controlling the steering of the rear wheels of the motor vehicle with the steerable front and rear wheels is therefore that the lateral shift of the center of gravity G at the time the motor vehicle is turned is reduced to zero.

Conventional methods of controlling the steering of the rear wheels include a method in which the rear wheels are steered through an angle which is predetermined according to the speed of travel of the motor vehicle or the steering angle of the steering wheel, and a method in which an actual lateral shift of the center of gravity is directly measured and the rear wheels are steered on the basis of the measured lateral shift of the center of gravity.

The latter method is capable of measuring the lateral shift of the center of gravity, but is not practically feasible because its reliability is low and the system for carrying out the method is large in size and expensive.

SUMMARY OF THE INVENTION

It is an object of the present invention to provide a practical method, different from the conventional methods, of controlling the steering of the rear wheels of a motor vehicle having a different rear wheel steering system from a front wheel steering system, the method being highly reliable and capable of reducing the lateral shift of the center of gravity substantially to zero with relative ease.

According to the present invention, there is provided a method of controlling the steering of rear wheels of a motor vehicle having two steerable righthand and lefthand front wheels and two steerable righthand and lefthand rear wheels, a front wheel steering device for steering the front wheels according to the angle through which a steering wheel is turned, a rear wheel steering device for steering the rear wheels, an actuator for actuating the rear wheel steering device, and a control device for controlling the operation of the actuator to steer the rear wheels in a direction which is selectively the same as or opposite to the direction in which the front wheels are turned. The method comprises the steps of determining the speeds of rotation of the four front and rear wheels with respect to the ground, and controlling the operation of the actuator with the control device so that any difference between the speeds of rotation of the front and rear wheels with respect to the ground will be reduced substantially to zero. The operation of the actuator may be controlled by the control device so that either the difference between the speeds of rotation of lefthand front and rear wheels with respect to the ground will be reduced substantially to zero, or the difference between the speeds of rotation of righthand front and rear wheels with respect to the ground will be reduced substantially to zero, or the sum of the difference between the speeds of rotation of lefthand front and rear wheels with respect to the ground and the difference between the speeds of rotation of righthand front and rear wheels with respect to the ground will be reduced substantially to zero.

According to the present invention, there is also provided a further method of controlling the steering of rear wheels of a motor vehicle having two steerable righthand and lefthand front wheels and two steerable righthand and lefthand rear wheels, a front wheel steering device for steering the front wheels according to the angle through which a steering wheel is turned, a rear wheel steering device for steering the rear wheels, an actuator for actuating the rear wheel steering device, and a control device for controlling the operation of the actuator to steer the rear wheels in a direction which is selectively the same as or opposite to the direction in which the front wheels are turned. This method comprises the steps of determining the speeds of rotation of the four front and rear wheels with respect to the ground, and controlling the operation of the actuator with the control device so that any difference between the sum of the speeds of rotation of the righthand and lefthand front wheels with respect to the ground and the sum of the speeds of rotation of the righthand and lefthand rear wheels with respect to the ground will be reduced substantially to zero.

With the above arrangement, the steering of the rear wheels is controlled so that the front and rear wheels will follow substantially the same paths, for thereby minimizing the lateral shift of the center of gravity of the motor vehicle.

The above and further objects, details and advantages of the present invention will become apparent from the following detailed description of a preferred embodiment thereof, when taken in conjunction with the accompanying drawings.

DETAILED DESCRIPTION OF THE PREFERRED EMBODIMENT

Figure 1A:
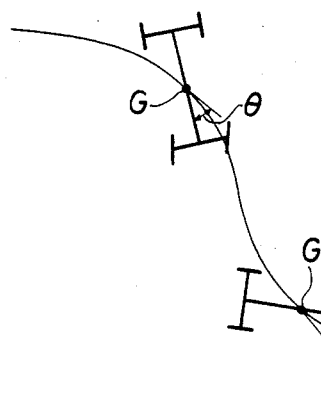
FIGS. 1(a) and 1(b) are schematic views showing the paths followed respectively by a motor vehicle with steerable front wheels and a motor vehicle with steerable front and rear wheels when the motor vehicles make S-shaped turns at a relatively high speed.
Figure 1B:
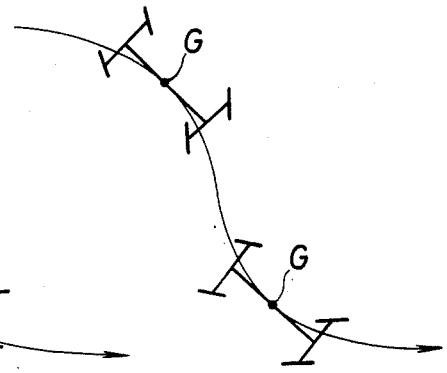
Figure 2A:
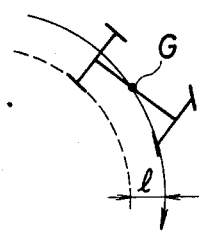
FIGS. 2(a) and 2(b) are schematic views showing the paths followed respectively by the discussed motor vehicles when they run along a curve at a relatively low speed.
Figure 2B:
Figure 3:
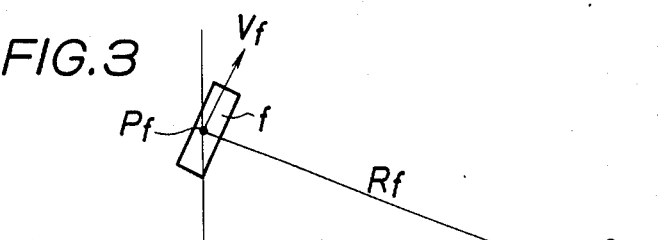
FIG. 3 is a schematic view explanatory of the basic concept of the present invention.

The basic concept of the present invention will first be described with reference to FIG. 3.

For the sake of brevity, front and rear wheels f, r on only one side (for example the lefthand side) of a motor vehicle will be discussed, and it is assumed that the center of gravity G of the motor vehicle is positioned at an intermediate point on the wheel base of the motor vehicle. In order to eliminate the lateral shift of the center of gravity G at the time the motor vehicle makes a turn, it is necessary that a triangle ($\Delta$O·Pf·Pr) formed by the center O of the turn, the center Pf of the front wheel, and the center Pr of the rear wheel be an isosceles triangle in which two sides O·Pf, O·Pr, i.e., the radii Rf, Rr of arcs along which the front and rear wheels make their turns, are equal to each other, that the center of gravity G be located on the perpendicular bisector of a line segment between the centers Pf, Pr of the front and rear wheels, and that the front and rear wheels f, r be directed perpendicularly to the line segments O·Pf, O·Pr extending between the front and rear wheel centers Pf, Pr and the center C of the turn. Since the angular velocities $\theta$ of the line segments O·Pf, O·Pr are equal to each other, speeds Vf, Vr of rotation of the front and rear wheels with respect to the ground are equal to each other at this time. The present invention is therefore based on the basic concept that steering the rear wheel so that the speeds Vf, Vr of rotation of the front and rear wheels will be equal to each other is equivalent to controlling the direction in which the rear wheel is steered so that the radii Rf, Rr of the turns of the front and rear wheels will be equal to each other, for thereby minimizing the lateral shift of the center of gravity of the motor vehicle.

Figure 4:
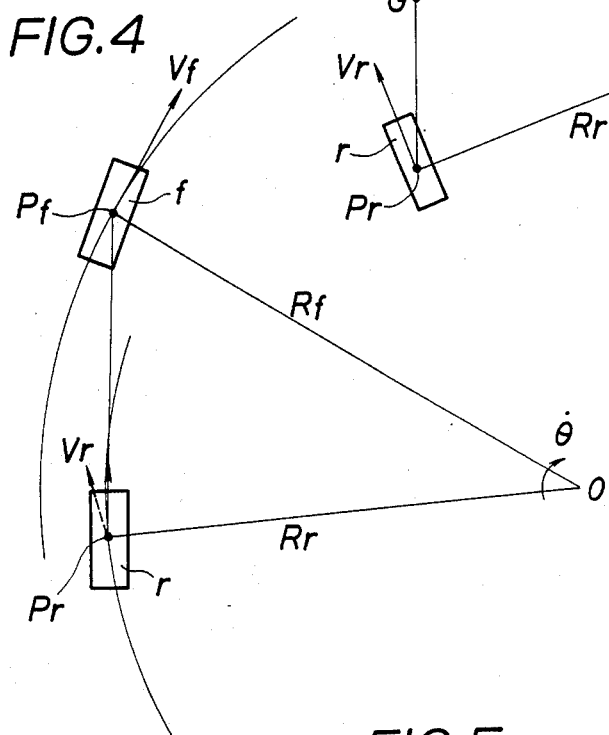
FIG. 4 is a schematic view explanatory of an example in which a rear wheel is steered on the basis of the concept of the present invention.

One example of steering the rear wheel based on the above conceptual idea will be described with reference to FIG. 4. In the illustrated example, only the front wheel f is steered to the right and the rear wheel r is not steered. At this time, the speed Vr of rotation of the rear wheel with respect to the ground is smaller than the speed Vf of rotation of the front wheel, and the radius Rr of the turn of the rear wheel is smaller than the radius Rf of the turn of the front wheel. In order to equalize the speed Vr of rotation of the rear wheel with respect to the ground to the speed Vf of rotation of the front wheel with respect to the ground, it is necessary to increase the radius Rr of the turn of the rear wheel so that it is equal to the radius Rf of the turn of the front wheel. To meet this requirement, the rear wheel must be steered in a direction opposite to the direction in which the front wheel is steered. When the speed Vr of rotation of the rear wheel with respect to the ground is higher than the speed Vf of rotation of the front wheel with respect to the ground, the above requirement can be met by steering the rear wheel in the same direction as that in which the front wheel is steered.

Figure 5:
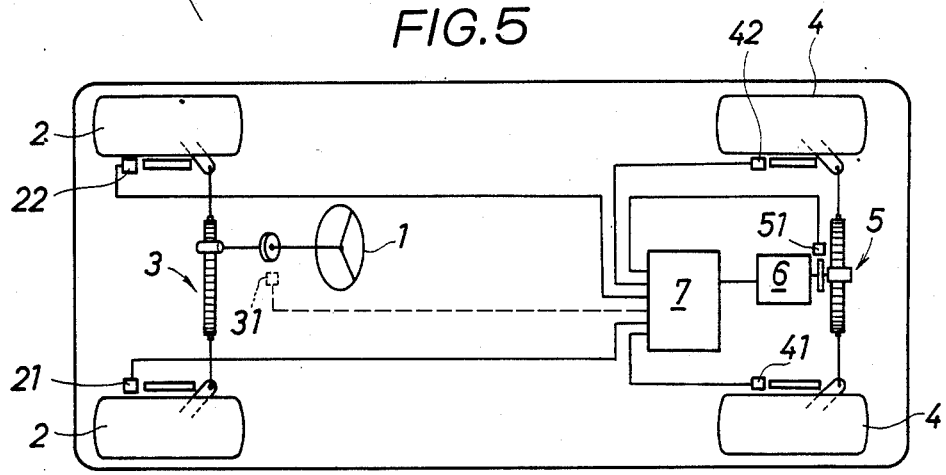
FIG. 5 is a schematic plan view of a system for steering the front and rear wheels of a motor vehicle.

FIG. 5 shows a system for steering the front and rear wheels of a motor vehicle. The motor vehicle includes a steering wheel 1, a pair of front wheels 2, 2, a device 3 for steering the front wheels 2, 2, a pair of rear wheels 4, 4, a device 5 for steering the rear wheels 4, 4, an actuator 6 for actuating the device 5, and a control device 7 comprising a computer for controlling the operation of the actuator 6. The actuator 6 may comprise an electric motor which is operable only when energized.

The rear wheel steering device 5 includes a steering sensor 51 for detecting the condition in which the rear wheels 4 are steered. When the steering wheels 4 are steered by the actuator 6 controlled by the control device 7, the steering sensor 51 provides the control device 7 with information representative of the extent to which the rear wheels 4 are steered.

The front and rear wheels 2, 4 are associated respectively with speed sensors 21, 22, 41, 42 for detecting the speeds Wfl, Wfr, Wrl, Wrr of rotation of these front and rear wheels. Detected speed information from these speed sensors 21, 22, 41, 42 is also applied to the control device 7.

The control device 7 samples, from time to time, the speeds Wfl, Wfr, Wrl, Wrr of rotation of the front and rear wheels 2, 4, computes effective tire radii Rfl, Rfr, Rrl, Rrr of the front and rear wheels 2, 4, respectively, and determines speeds Rfl·Wfl, Rfr·Wfr, Rrl·Wrl, Rrr·Wrr of the front and rear wheels with respect to the ground as the products RW of the speeds W and the effective tire radii R of the front and rear wheels 2, 4 while the motor vehicle is making a turn. The control device 7 is programmed to effect the above computation and also to control the operation of the actuator 6 so that the difference (Rfl·Wfl−Rrl·Wrl) between the speeds of the lefthand front and rear wheels 2, 4 with respect to the ground, or the difference (Rfr·Wfr−Rrr·Wrr) between the speeds of the righthand front and rear wheels 2, 4 with respect to the ground, or at least one of these differences, or the sum $(Rfl \cdot Wfl - Rrl \cdot Wrl) + (Rfr \cdot Wfr - Rrr \cdot Wrr)$ of these differences, or the difference $(Rfl \cdot Wfl + Rfr \cdot Wfr) - (Rrl \cdot Wrl + Rrr \cdot Wrr)$ between the sum of the speeds of the front wheels 2, 2 with respect to the ground and the sum of the speeds of the rear wheels 4, 4 with respect to the ground, will be reduced substantially to zero.

In the above embodiment, the speeds of rotation of the wheels with respect to the ground are derived from the effective radii of the tires. However, the speeds of rotation of the wheels may be measured directly or derived in other way.

Figure 6:
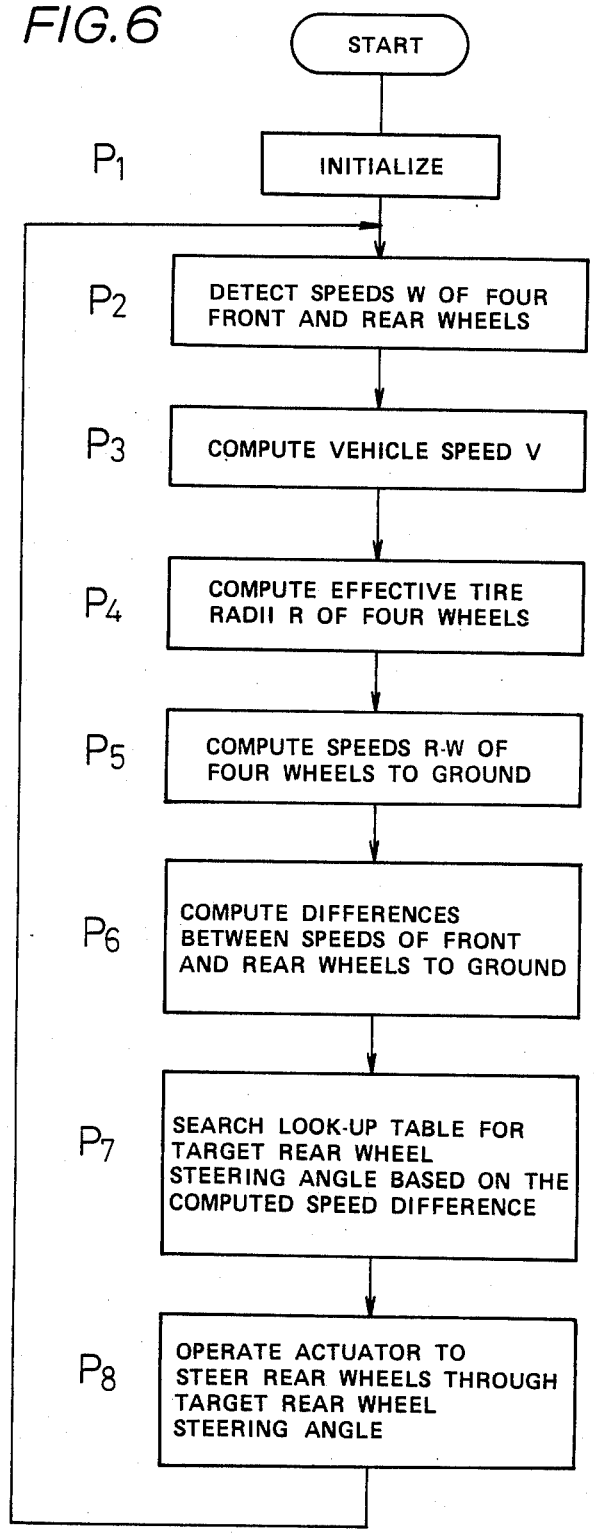
FIG. 6 is a flowchart of successive steps of operation of a control device in the system shown in FIG. 5.

Operation of the control device 7 will be described below with reference to the flowchart of FIG. 6.

The control device 7 is initialized when an ignition switch of the motor vehicle is turned on in a step P1. The speeds Wfl, Wfr, Wrl, Wrr of rotation of the front and rear wheels 2, 4, detected by the speed sensors 21, 22, 41, 42 are read in a step P2, and the speed V of travel of the motor vehicle is computed in a step P3. Then, the effective tire radii R of the front and rear wheels 2, 4 are computed from the speed V of travel of the motor vehicle and the speeds Wfl, Wfr, Wrl, Wrr of rotation of the front and rear wheels 2, 4 in a step P4. Thereafter, the processing goes to a step P5 which computes the speeds R.W of rotation of the front and rear wheels 2, 4 with respect to the ground, followed by a step P6 in which the difference $(Rfl \cdot Wfl - Rrl \cdot Wrl)$ between the speeds of the lefthand front and rear wheels 2, 4 with respect to the ground, or the difference $(Rfr \cdot Wfr - Rrr \cdot Wrr)$ between the speeds of the righthand front and rear wheels 2, 4 with respect to the ground, or the sum $(Rfl \cdot Wfl - Rrl \cdot Wrl) + (Rfr \cdot Wfr - Rrr \cdot Wrr)$ of these differences, or the difference $(Rfl \cdot Wfl + Rfr \cdot Wfr) - (Rrl \cdot Wrl + Rrr \cdot Wrr)$ between the sum of the speeds of the front wheels 2, 2 with respect to the ground and the sum of the speeds of the rear wheels 4, 4 with respect to the ground, is computed.

For motor vehicles in which the treads of the front and rear wheels are equal and the center of gravity is positioned at the center of the wheel base, the difference $(Rfl \cdot Wfl - Rrl \cdot Wrl)$ between the speeds of the lefthand front and rear wheels 2, 4 with respect to the ground, or the difference $(Rfr \cdot Wfr - Rrr \cdot Wrr)$ between the speeds of the righthand front and rear wheels 2, 4 with respect to the ground, or at least one of these differences should be reduced to zero to allow the front and rear wheels 2, 4 to go along substantially the same paths, minimizing the lateral shift of the center of gravity of the motor vehicle.

In many conventional motor vehicles, however, the treads of the front and rear wheels are not equal, and the center of gravity of the motor vehicle is not positioned at the center of the wheel base. Therefore, the sum $(Rfl \cdot Wfl - Rrl \cdot Wrl) + (Rfr \cdot Wfr - Rrr \cdot Wrr)$ of the above differences, or the difference $(Rfl \cdot Wfl + Rfr \cdot Wfr) - (Rrl \cdot Wrl + Rrr \cdot Wrr)$ between the sum of the speeds of the front wheels 2, 2 with respect to the ground and the sum of the speeds of the rear wheels 4, 4 with respect to the ground, should be reduced to zero for minimizing the lateral shift of the center of gravity of the motor vehicle.

In a step P7, a look-up table of rear wheel steering angles in the control device 7 is searched for a desired target rear wheel steering angle based on the computed difference $(Rfl \cdot Wfl - Rrl \cdot Wrl)$ or $(Rfr \cdot Wfr - Rrr \cdot Wrr)$ or their sum $(Rfl \cdot Wfl - Rrl \cdot Wrl) + (Rfr \cdot Wfr - Rrr \cdot Wrr)$. A signal indicative of the target rear wheel steering angle is then applied by the control device 7 to the actuator 6 in a step 8 to steer the rear wheels 41, 42 so that the difference $(Rfl \cdot Wfl - Rrl \cdot Wrl)$ or $(Rfr \cdot Wfr - Rrr \cdot Wrr)$, or at least one of these differences, or their sum $(Rfl \cdot Wfl - Rrl \cdot Wrl) + (Rfr \cdot Wfr - Rrr \cdot Wrr)$ will be eliminated. Then, the processing returns to the step P2 to repeat the cycle shown in FIG. 6.

The method of controlling the steering of rear wheels as described above may be employed in either a system for steering the rear wheels independently of the front wheels that are steered by the steering wheel, or a system for steering the rear wheels based on the speed of travel of the motor vehicle or the steering wheel angle in a direction which is the same as or opposite to the direction in which the front wheels are steered. In the latter system, a steering angle sensor 31 indicated by the dotted lines in FIG. 5 is associated with the steering wheel 1. In operation, a steering wheel angle detected by the steering angle sensor 31 is supplied to the control device 7, and data determined by the detected steering wheel angle on a temporary direction in which to steer the rear wheels and a temporary extent to which to steer the rear wheels is corrected by the information produced by the method of the present invention. Then, the operation of the actuator 6 is controlled on the basis of the corrected data for more practical control of the steering of the rear wheels.

With the arrangement of the present invention, as described above, the speeds of rotation of the front and rear wheels on the righthand and lefthand sides of the motor vehicle with respect to the ground are determined, and the steering of the rear wheels is controlled by the control device so that the difference between the speeds of rotation of the front and rear wheels will be reduced substantially to zero. The method of the invention is therefore highly reliable, is capable of relatively easily reducing the lateral shift of the center of gravity of the motor vehicle substantially to zero, and is practical since it is not necessary to measure the lateral shift of the center of gravity.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A method of controlling the steering of rear wheels of a motor vehicle having two steerable righthand and lefthand front wheels and two steerable righthand and lefthand rear wheels, a front wheel steering device for steering the front wheels according to the angle through which a steering wheel is turned, a rear wheel steering device for steering the rear wheels, an actuator for actuating said rear wheel steering device, and a control device for controlling the operation of the actuator to steer the rear wheels in a direction which is selectively the same as or opposite to the direction in which the front wheels are turned, said method comprising the steps of:

determining the speeds of rotation of the four front and rear wheels with respect to the ground; and controlling the operation of said actuator with said control device so that any difference between the speeds of rotation of the front and rear wheels with respect to the ground will be reduced substantially to zero.

2. A method according to claim 1, wherein the operation of said actuator is controlled by said control device so that the difference between the speeds of rotation of lefthand front and rear wheels with respect to the ground will be reduced substantially to zero.

3. A method according to claim 1, wherein the operation of said actuator is controlled by said control device so that difference between the speeds of rotation of righthand front and rear wheels with respect to the ground will be reduced substantially to zero.

4. A method according to claim 1, wherein the operation of said actuator is controlled by said control device so that the sum of the difference between the speeds of rotation of lefthand front and rear wheels with respect to the ground and the difference between the speeds of rotation of righthand front and rear wheels with respect to the ground will be reduced substantially to zero.

5. A method of controlling the steering of rear wheels of a motor vehicle having two steerable righthand and lefthand front wheels and two steerable righthand and lefthand rear wheels, a front wheel steering device for steering the front wheels according to the angle through which a steering wheel is turned, a rear wheel steering device for steering the rear wheels, an actuator for actuating said rear wheel steering device, and a control device for controlling the operation of the actuator to steer the rear wheels in a direction which is selectively the same as or opposite to the direction in which the front wheels are turned, said method comprising the steps of:

determining the speeds of rotation of the four front and rear wheels with respect to the ground; and controlling the operation of said actuator with said control device so that any difference between the sum of the speeds of rotation of the righthand and lefthand front wheels with respect to the ground and the sum of the speeds of rotation of the righthand and lefthand rear wheels with respect to the ground will be reduced substantially to zero.

* * * * *

UNITED STATES PATENT AND TRADEMARK OFFICE
CERTIFICATE OF CORRECTION

PATENT NO. : 4,669,744
DATED : June 2, 1987
INVENTOR(S) : Shoichi SANO et al.

It is certified that error appears in the above-identified patent and that said Letters Patent is hereby corrected as shown below:

```
Column 1, line 12, change "frontwheel" to --front-wheel--.
Column 3, line 35, after "is" insert --to be--.
          line 65, change "θ" to --θ--.
Column 5, line 28, change "R.W" to --R•W--.
```

Signed and Sealed this

Fifteenth Day of December, 1987

Attest:

DONALD J. QUIGG

*Attesting Officer*   *Commissioner of Patents and Trademarks*